Patented Apr. 19, 1938

2,114,781

UNITED STATES PATENT OFFICE 2,114,781

WELDING AND BRAZING ALLOY

Hans Kanz, Zurich-Albisrieden, Switzerland

No Drawing. Application December 10, 1935, Serial No. 53,817. In Germany December 11, 1934

4 Claims. (Cl. 219—8)

My invention relates to metallic rods used for the welding of brass and similar alloys which have a high percentage of zinc and a comparatively low melting point.

For the welding of such alloys, welding materials are employed of which the melting point is somewhat below the melting point of the alloys.

On the other hand, the use of such soldering materials is of great advantage, which have a low melting point because these welding materials show a ready fluidity so that the welding operations can be carried out more conveniently and more rapidly.

The disadvantage of such welding materials which always contain a considerable percentage of zinc lies therein that the rods cannot be reduced by mechanical work because they are too brittle and that the joints produced by the application of such welding materials are lacking in toughness and strength and produce a rough and uneven surface.

Now, it is known that copper-zinc alloys lose their brittleness and, therefore, can be mechanically worked if nickel, or cobalt are added. Such alloys containing copper, zinc, nickel and/or cobalt with or without the addition of other elements are known.

However, the object of the present invention is a provision of a copper containing welding rod with a high content of zinc, which besides being adapted to be easily mechanically worked, can be used to great advantage for the making of joints which have a great strength and toughness and show an even and smooth surface.

Another object of this invention is the provision of a copper and zinc containing welding rod which has a low melting point of about 800° C. and a surprisingly ready fluidity.

Another object of this invention is the provision of a copper and zinc containing welding rod, which in spite of its high content of zinc allows foldless and easily workable joints.

Other objects and details of my invention will be apparent from the following description:

I find that a welding rod consisting of copper, zinc, nickel and cobalt with the following ranges of proportions:

| | Percent |
|---|---|
| Copper | 24–42 |
| Nickel and cobalt | 0.25–20 |

The balance zinc
has the properties which correspond to the above-named requirements.

To further lower the melting point of this welding rod without in any way lessening the good qualities of the same, cadmium may be added in a proportion of 0.5–20%.

The addition of nickel and cobalt is varied according to the content of copper and zinc being present in the welding rod. In the case of such a copper content, which is a little below the limit at which the welding rod can be mechanically worked, a small addition of nickel imparts to the rod a satisfactory toughness.

In the case of rods which have a very high content of zinc, the addition of nickel and cobalt must be increased to the upper limits given in this specification, to make the rod easily workable.

To make the rod brighter in color, the addition of nickel and cobalt must be raised up to 20%.

Further elements, for instance, iron up to 5%; manganese up to 15%; tin up to 8%; silicon, aluminum, phosphorous, titanium, tellurium, boron, up to 3% may be added, to improve in a known manner the strength, hardness, toughness of the rod and its resistance against wear and corrosion.

A desirable welding rod for the purposes above-mentioned may have the following composition:

| | Percent |
|---|---|
| Copper | 41 |
| Zinc | 54.2 |
| Nickel and cobalt | 4.5 |
| Silicon | 0.3 |

This welding rod has a tensile strength of about 35 kg./mm.$^2$ and an elongation of about 5% and a Brinell hardness of about 135 kg./mm.$^2$.

The welding rods manufactured according to this invention may also be provided in a known manner with a coating consisting of one or more of the above named additional elements. They may also have a flux associated therewith in a form of a coating.

Having thus described my invention, what I claim is:

1. A welding rod comprising copper, zinc, nickel and cobalt in the following ranges of proportions:

| | Percent |
|---|---|
| Copper | 24–42 |
| Nickel and cobalt | 0.25–20 |
| Zinc | 38–75.75 |

2. A welding rod according to claim 1 containing iron up to 5%.

3. A welding rod according to claim 1 containing tin up to 8%.

4. A welding rod according to claim 1, containing at least one of the elements: silicon, aluminum, phosphorus, titanium, tellurium or boron up to 3%.

HANS KANZ.